US012621228B1

(12) United States Patent　　　　(10) Patent No.:　US 12,621,228 B1
　　　Kumar et al.　　　　　　　　　　(45) Date of Patent:　　　May 5, 2026

(54) DATA TRANSFORMATION TECHNIQUES FOR EVENT DATA IN MULTI-SYSTEM COMPUTING ENVIRONMENTS

(71) Applicant: EQUIFAX INC., Atlanta, GA (US)

(72) Inventors: Sukesh Kumar, Suwanee, GA (US); Lalit Kataria, Johns Creek, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 19/234,009

(22) Filed: Jun. 10, 2025

Related U.S. Application Data

(63) Continuation of application No. 19/191,573, filed on Apr. 28, 2025.

(51) Int. Cl.
　　　*H04L 43/08*　　　　　(2022.01)
(52) U.S. Cl.
　　　CPC .................................... *H04L 43/08* (2013.01)
(58) Field of Classification Search
　　　CPC ........................................................ H04L 43/08
　　　See application file for complete search history.

100

(56)　　　　　　　References Cited

U.S. PATENT DOCUMENTS

| 8,438,630 | B1 * | 5/2013 | Clifford | ................. | G06F 21/60 |
| | | | | | 713/168 |
| 12,056,221 | B2 * | 8/2024 | Rapowitz | ............ | G06F 21/6245 |
| 2018/0293582 | A1 * | 10/2018 | Binns | ..................... | G06Q 20/20 |
| 2020/0005312 | A1 * | 1/2020 | Bull | ....................... | G08B 13/22 |
| 2021/0304204 | A1 * | 9/2021 | Ramesh | .................. | G06N 5/01 |

* cited by examiner

*Primary Examiner* — Viet D Vu

(74) *Attorney, Agent, or Firm* — Kilpatrick Townsend & Stockton LLP

(57)　　　　　　　ABSTRACT
An event restraint-delivery computing system receives event data in a high-volume event stream from source computing systems. For each event data object in the high-volume event data stream, the event restraint-delivery computing system identifies at least one event data object subset associated with a respective recipient computing system. The event restraint-delivery computing system withholds the event data object subset from the respective recipient computing system based on restraint status data for the event data object subset. Based on a change in the respective restraint status data, such as a change indicating that the event data object subset is modified to fulfill a trigger criterion, the event restraint-delivery computing system provides the event data object subset to the respective recipient computing system. In addition, the respective recipient computing system performs a computing function based on event data in the event data object subset.

17 Claims, 5 Drawing Sheets

Figure 1
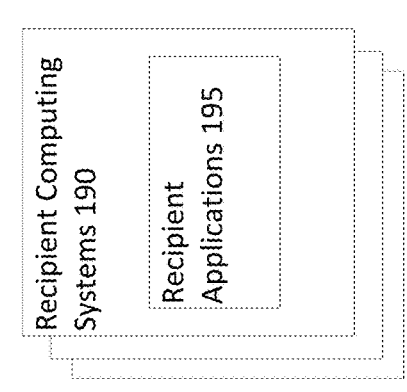
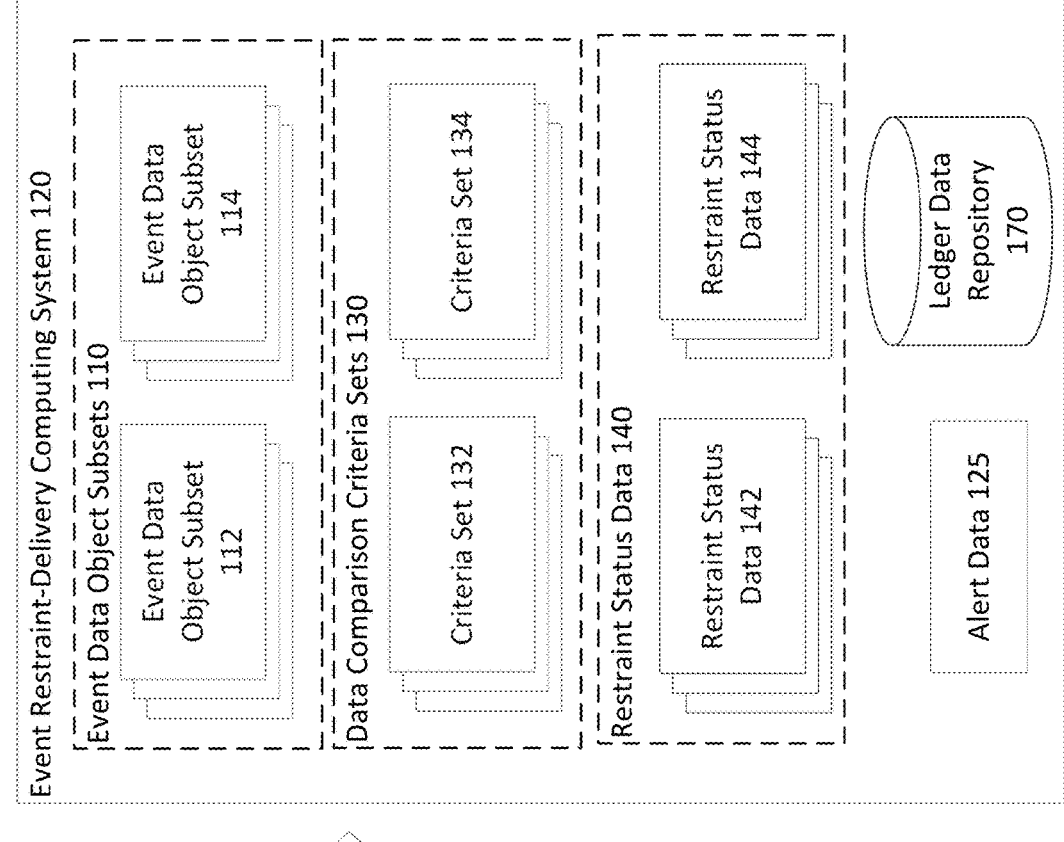
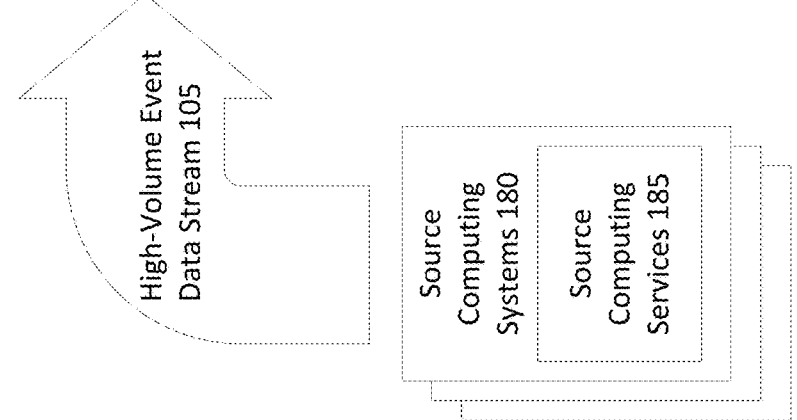
100

Event Restraint-Delivery Computing System 220

Transformation Technique Data 222

Alert Data 225

Event Data Object Subset 214

Criteria Set 234

Restraint Status Data 244

Trained Machine-Learning Model 250

Classification Output Data 255

Event Data Object Subset 212

Criteria Set 232

Restraint Status Data 242

High-Volume Event Data Stream 205

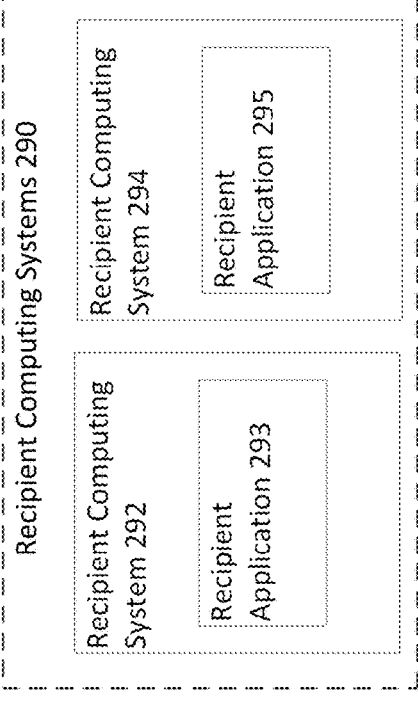

Recipient Computing Systems 290

Recipient Computing System 294

Recipient Application 295

Recipient Computing System 292

Recipient Application 293

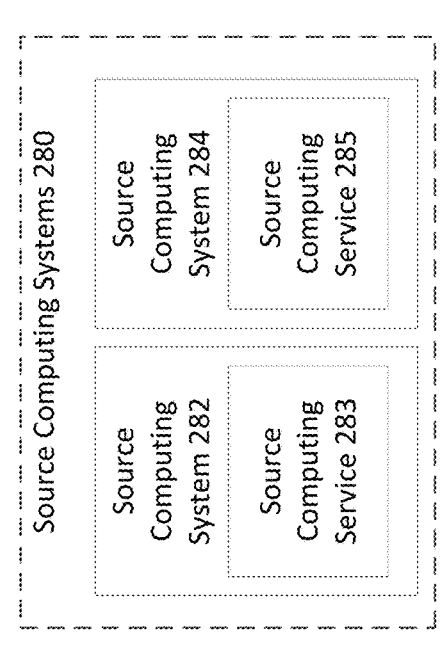

Source Computing Systems 280

Source Computing System 284

Source Computing Service 285

Source Computing System 282

Source Computing Service 283

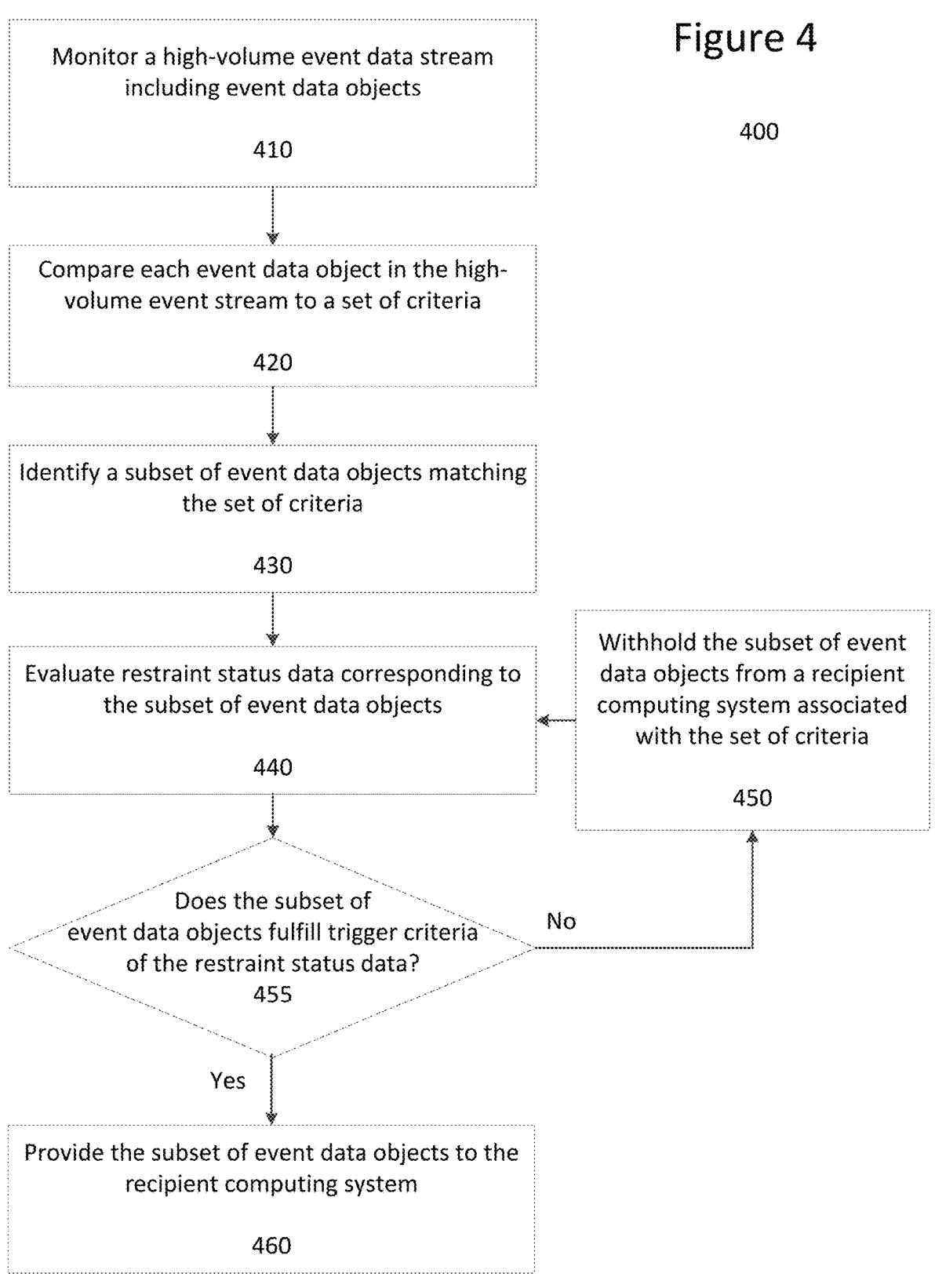

Monitor a high-volume event data stream including event data objects

410

Compare each event data object in the high-volume event stream to a set of criteria

420

Identify a subset of event data objects matching the set of criteria

430

Evaluate restraint status data corresponding to the subset of event data objects

440

Withhold the subset of event data objects from a recipient computing system associated with the set of criteria

450

Does the subset of event data objects fulfill trigger criteria of the restraint status data?

455

No

Yes

Provide the subset of event data objects to the recipient computing system

460

DATA TRANSFORMATION TECHNIQUES FOR EVENT DATA IN MULTI-SYSTEM COMPUTING ENVIRONMENTS

CROSS-REFERENCE TO RELATED APPLICATIONS

This application is a continuation of U.S. application Ser. No. 19/191,573, filed Apr. 28, 2025, entitled "DATA TRANSFORMATION TECHNIQUES FOR EVENT DATA IN MULTI-SYSTEM COMPUTING ENVIRONMENTS", the disclosure of which is hereby incorporated by reference.

TECHNICAL FIELD

This disclosure relates generally to the field of transformation and delivery of event data, and more specifically relates to techniques to withhold high-volume event data in a multi-system computing environment.

BACKGROUND

In a shared computing environment, multiple source computing systems can generate event data, such as event data describing requests that are handled by one or more applications that are implemented via the source computing systems. In some cases, the event data is provided to one or more recipient computing systems for performance of additional computing functions, such as recipient applications configured to utilize transformed event data for determining system usage statistics, potential fraud events, or other types of multi-system output data based on event data from large quantities of source computing systems (e.g., hundreds of systems, thousands of systems, etc.).

In some contemporary approaches, each source computing system that generates event data is also configured to implement its own transformation techniques for event data, such as modifying event data to have a particular format or encryption type for a particular recipient computing system. In this type of contemporary approach, each particular source computing system maintains information about all transformation techniques for all recipient computing system that receive the event data from the particular source computing system. In some cases, this contemporary approach causes a high amount of inefficiency in a computing environment that includes large quantities of source computing systems (e.g., hundreds of systems or more), as each particular source computing system that generates event data is also configured to implement respective transformation techniques for each recipient computing system that receives the event data. Inefficiencies in the contemporary approach can include code duplication across multiple source computing systems, a relatively high error rate among duplicated code, or reduced security for recipient computing systems that receive event data that is inconsistently transformed among multiple source computing systems.

SUMMARY

Various aspects of the present disclosure involve coordinating, among multiple computing systems, multiple subsets of event data objects identified from a high-volume event data stream in a computing environment. According to certain embodiments, a method includes monitoring a high-volume event data stream. The high-volume event data stream includes multiple event data objects. Each event data object in the high-volume event data stream is compared to a first set of criteria. The method further includes identifying, from the monitored high-volume event data stream, a subset of event data objects. Each event data object identified for inclusion in the subset of event data objects matches the first set of criteria. The method further includes withholding the subset of event data objects from a first recipient computing system associated with the first set of criteria. The subset of event data objects is withheld during an evaluation of restraint status data of the subset of event data objects. The method further includes providing the subset of event data objects to the first recipient computing system, responsive to identifying a change in the restraint status data of the subset of event data objects. The first recipient computing system is configured to perform one or more computing functions based on the subset of event data objects.

According to certain embodiments, an event restraint-delivery computing system comprises a processing device and a memory device in which instructions executable by the processing device are stored for causing the processing device to perform operations. The operations comprise monitoring a high-volume event data stream. The high-volume event data stream includes multiple event data objects. Each event data object in the high-volume event data stream is compared to a first set of criteria. The operations further comprise identifying, from the monitored high-volume event data stream, a subset of event data objects. Each event data object identified for inclusion in the subset of event data objects matches the first set of criteria. The operations further comprise withholding the subset of event data objects from a first recipient computing system associated with the first set of criteria. The subset of event data objects is withheld during an evaluation of restraint status data of the subset of event data objects. The operations further comprise providing the subset of event data objects to the first recipient computing system, responsive to identifying a change in the restraint status data of the subset of event data objects. The first recipient computing system is configured to perform one or more computing functions based on the subset of event data objects.

According to certain embodiments, a non-transitory computer-readable storage medium having program code that is executable by a processor device to cause a computing device to perform operations. The operations comprise monitoring a high-volume event data stream. The high-volume event data stream includes multiple event data objects. Each event data object in the high-volume event data stream is compared to a first set of criteria. The operations further comprise identifying, from the monitored high-volume event data stream, a subset of event data objects. Each event data object identified for inclusion in the subset of event data objects matches the first set of criteria. The operations further comprise withholding the subset of event data objects from a first recipient computing system associated with the first set of criteria. The subset of event data objects is withheld during an evaluation of restraint status data of the subset of event data objects. The operations further comprise providing the subset of event data objects to the first recipient computing system, responsive to identifying a change in the restraint status data of the subset of event data objects. The first recipient computing system is configured to perform one or more computing functions based on the subset of event data objects.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where:

FIG. 1 is a block diagram depicting an example of a computing environment in which an event restraint-routing computing system coordinates multiple subsets of event data objects among multiple computing systems, according to certain embodiments;

FIG. 2 is a block diagram depicting an example of a computing environment in which an event restraint-delivery computing system determines one or more types of classifications for an event data object subset, according to certain embodiments;

FIG. 4 is a flow chart depicting an example of a process for generating multiple subsets of event data objects and coordinating delivery of the multiple subsets among multiple computing systems, according to certain embodiments.

DETAILED DESCRIPTION

Figure 3:
FIG. 3 is a block diagram depicting an example timeline during which an event restraint-delivery computing system receives event data objects, determines one or more classifications of the event data objects, and delivers multiple event data object subsets, according to certain embodiments.

As discussed above, contemporary approaches for providing event data to recipient computing systems can be inefficient or inconsistent. In some cases, this contemporary approach causes a high amount of inefficiency in a computing environment that includes large quantities of source computing systems (e.g., hundreds or thousands of systems). For example, inefficiencies in the contemporary approach can include duplication of code bases (e.g., programming code for implementing respective transformation techniques) across the large quantities of source computing systems, which can result in relatively high manual effort to keep the code bases current for each recipient computing system, such as relatively high expenditures of time and labor to keep the code bases up to date. Additional inefficiencies in the contemporary approach can include a relatively high error rate among respective transformation techniques, such as errors caused by source computing systems using outdated transformation techniques to provide event data to a recipient system that has updated one or more transformation techniques. In some cases, inefficiencies in the contemporary approach can include reduced security for recipient computing systems. For example, in the contemporary approach a malicious actor may attempt to exploit the respective aggregation techniques implemented by the large quantities of source computing systems, such as by submitting large quantities of requests in an attempt to cause at least one source computing system to generate event data that includes malicious code.

Certain embodiments described herein provide for coordinating delivery of event among multiple computing systems, such as recipient computing systems. An event restraint-delivery computing system can generate multiple event data object subsets that include event data identified from a high-volume event data stream. The high-volume event data steam can include a large quantity (e.g., hundreds, thousands, or more) of event data objects generated by multiple source computing systems. The event restraint-delivery computing system can identify, in the high-volume event data stream, event data objects for a particular subset, such as by comparing some or all event data objects in the high-volume event data stream to multiple criteria sets during a particular timestep, e.g. comparing all event data objects in the high-volume event data stream each second. In addition, the event restraint-delivery computing system withholds the event data object subsets from a recipient computing system, such as withholding a subset based on one or more trigger criteria. In some cases, responsive to determining that a particular event data object subset fulfills at least one trigger criterion for a particular recipient computing system, the event restraint-delivery computing system delivers the particular event data object subset to the particular recipient computing system.

The following examples are provided to introduce certain embodiments of the present disclosure. An event restraint-delivery computing system includes a trained machine-learning model and multiple data structures, including criteria sets, transformation technique data, and restraint status data. Each of the criteria sets, transformation technique data, and restraint status data is associated with a respective recipient computing system. The event restraint-delivery computing system receives multiple event data objects in a high-volume event data stream, which is changed multiple times per second to include, modify, or provide hundreds (or more) event data objects during each second. The event data objects are provided to the event restraint-delivery computing system by multiple source computing systems, such as a large quantity (e.g., hundreds or more) of source computing systems that add event data objects to the event data stream based on requests that are handled by the source computing systems.

For each event data object in the high-volume event data stream, the event restraint-delivery computing system identifies at least one event data object subset (also referred to herein as an "EDO subset") that is associated with a respective recipient computing system. For example, the event restraint-delivery computing system determines that multiple event data objects received via the event stream match a respective criteria set associated with the respective recipient computing system. Based on the determination, the event restraint-delivery computing system identifies a particular EDO subset that includes the multiple event data objects, such as a particular EDO subset that is associated with the respective recipient computing system. In addition, the event restraint-delivery computing system withholds the particular EDO subset from the respective recipient computing system based on an evaluation of respective restraint status data associated with the respective recipient computing system. For example, the event restraint-delivery computing system withholds the particular EDO subset responsive to determining that the particular EDO subset fails to fulfill at least one trigger criterion, e.g., included in or associated with the respective restraint status data.

Responsive to identifying a change in the respective restraint status data, such as a change indicating that the particular EDO subset has been modified (e.g., includes an additional event data object) to fulfill the trigger criterion, the event restraint-delivery computing system provides the particular EDO subset to the respective recipient computing system. In addition, the respective recipient computing system performs one or more computing functions based on event data included in the particular EDO subset. An example of a computing function performed by the respective recipient computing system includes determining a potential fraud risk for a group of requests described by the EDO subset, such as a group of multiple requests handled by different ones of the source computing systems. In this example, by receiving event data describing the group of requests at a same time via the particular EDO subset, the respective recipient computing system could determine the potential fraud risk with higher accuracy, such as compared to receiving the event data at various times (e.g., without the event restraint-delivery computing system withholding the particular EDO subset for delivery).

As used herein, the terms "event stream" and "event data stream" refer to a set of event data objects that is continuously changing, i.e., multiple event data objects are being added to and removed from the set of event data objects on a continuous basis. As used herein, terms such as "continuous," "continuously," and the like refer to events occurring multiple times per second, i.e., the event stream or the event data stream includes a set of event data objects that is being changed multiple times per second.

In some examples, an event stream or an event data stream is high-volume, i.e., includes more event data object than can be evaluated (or otherwise processed) by a human mind. As used herein, the term "high-volume" refers to an event stream or an event data stream that includes hundreds or thousands (or more) of event data objects that are generated each second. In addition, as used herein, a high-volume event stream or high-volume event data stream includes a quantity of event data objects that are generated each second, wherein the per-second quantity of event data objects is beyond an evaluation capacity of a human mind.

Certain aspects described herein, such as an event restraint-delivery computing system configured to identify and withhold subsets of event data objects, can improve coordination of communicating event data from multiple source computing systems to multiple recipient computing systems. For example, contemporary approaches for delivering event data from a particular source computing system to a particular recipient computing system may fail to identify additional event data from additional source computing systems, and may cause the particular recipient computing system to perform a computing function with inaccurate or incomplete event data. Based on the improved techniques described herein, an event restraint-delivery computing system can withhold event data, e.g., withholding an EDO subset, from a particular recipient computing system until a threshold quantity (e.g., fulfilling a trigger criterion) of event data is received, which provides the particular recipient computing system with sufficient event data to accurately perform a computing function. In some cases, an event restraint-delivery computing system that withholds EDO subsets from a recipient computing system can increase accuracy of computing functions performed by the recipient computing system, such as by providing an EDO subset with a quantity and type of event data that is identified (e.g., based on criteria sets associated with the recipient computing system) for a particular function performed by the recipient computing system.

In some embodiments, an event restraint-delivery computing system configured to perform one or more of the techniques described herein can improve efficient use of computing resources, such as computing resources for one or more of the event restraint-delivery computing system, source computing systems, or recipient computing systems. For example, the event restraint-delivery computing system may include one or more types of specialized computing components (e.g., high-speed processors, fast-access memory components) that are configured for use in high-speed data environments, such as for identifying particular event data objects in a high-volume continuous event data stream. In some cases, inclusion of such specialized computing components in the event restraint-delivery computing system can reduce computing resources needs in one or more recipient computing systems. For example, an event restraint-delivery computing system that includes specialized computing components configured to receive, identify, and deliver event data to multiple recipient computing systems can reduce redundant use of computing resources, such as reducing reliance on multiple specialized components included in each of the multiple recipient computing systems.

In some embodiments, an event restraint-delivery computing system configured to perform one or more of the techniques described herein can improve security for one or more of source computing systems or recipient computing systems. As an example, the event restraint-delivery computing system can transform or otherwise analyze event data that is identified from a high-volume continuous event data stream prior to providing the event data to a recipient computing system. In some cases, transformation of the event data by the event restraint-delivery computing system can reduce exposure of the recipient computing systems to potentially malicious data, such as malicious code introduced in a request submitted to the source computing service (e.g., a request from a compromised device). As an additional example, the event restraint-delivery computing system can identify a potential event pattern, such as a potential fraud pattern, based on event data that is received from multiple source computing systems. In some cases, the event restraint-delivery computing system identifies the potential event pattern with increased speed or accuracy as compared to one or more of the source computing systems, such as a faster identification based on availability of large quantities of event data received by the event restraint-delivery computing system. In some cases, identification of a potential event pattern by the event restraint-delivery computing system can improve response time for one or more source computing systems affected by the potential event pattern, such as reducing an elapsed time before a source computing system implements a fraud mitigation technique (e.g., requesting additional verification regarding a purchase).

Referring now to the drawings, FIG. 1 is a diagram depicting an example of a computing environment 100 in which an event restraint-delivery computing system 120 coordinates multiple subsets of event data objects among multiple computing systems. In the computing environment 100, the event restraint-delivery computing system 120 coordinates delivery of multiple EDO subsets that are received from multiple source computing systems 180, transformed via one or more techniques applied by the event restraint-delivery computing system 120, and provided to multiple recipient computing systems 190. In FIG. 1, the event restraint-delivery computing system 120 identifies the multiple EDO subsets from a high-volume event data stream 105 (also referred to herein as "event stream 105"). The event stream 105 is a high-volume event stream as described above, such as an event data stream in which hundreds or thousands (or more) of event data objects are generated (e.g., added to the event stream 105) each second. In addition, the event stream 105 is a continuous event stream as described above, such as an event data stream in which event data objects in the event stream 105 are changed (e.g., added, removed) multiple times per second. In FIG. 1, the computing environment 100 includes the event restraint-delivery computing system 120, the multiple source computing systems 180, and the multiple recipient computing systems 190. In some implementations, the event restraint-delivery computing system 120, the source computing systems 180, the recipient computing systems 190, and one or more additional computing systems are configured to exchange data via one or more computing networks, such as a local or global area network.

In the computing environment 100, each of the source computing systems 180 provides one or more computer-implemented services, such as the source computing services 185. Examples of the source computing services 185 can include software applications, online environments (e.g., productivity environments, shopping environments, gaming environments), or other types of computer-implemented services that respond to requests provided by human users, e.g., requests submitted via personal computing devices of human users. In addition, each of the source computing systems 180 generates event data, such as one or more event data objects, describing the requests that are received by the source computing systems 180. For example, a particular source computing system in the source computing systems 180 generates an event data object for each request received by and responded to by the particular source computing system. Each event data object generated by the source computing systems 180 respectively describes a request, such as previously received requests that have been completed, refused, placed in an error state, or have had other outcomes determined by the source computing systems 180. As each of the source computing systems 180 generates event data objects for received requests, each of the source computing systems 180 submits the generated event data objects to the event restraint-delivery computing system 120. As described herein, inclusion of one or more event data objects in the event stream 105 indicates that the one or more event data objects are provided to the event restraint-delivery computing system 120, such as submission by one or more of the source computing systems 180 that generate the one or more event data objects.

In the computing environment 100, each of the recipient computing systems 190 provides at least one computer-implemented application, such as the recipient applications 195. Examples of the recipient applications 195 can include data verification functions, database access functions, risk evaluation functions (e.g., fraud probability evaluation, malicious code identification), or other types of computer-implemented functions which can generate data outputs based on one or more event data objects, such as subsets of event data objects identified by the event restraint-delivery computing system 120. In some cases, the recipient computing systems 190 provide one or more data outputs generated by the recipient applications 195 to one or more additional computing systems. For example, if a particular one of the recipient applications 195 determines an elevated fraud risk associated with a particular subset of event data objects, the particular one of the recipient applications 195 can provide an output including alert data to an additional computing system configured to perform fraud mitigation tasks. In some cases, one or more of the recipient computing systems 190 can be configured to provide generated data outputs to the event restraint-delivery computing system 120, which can provide the data output to an additional computing system.

In FIG. 1, the recipient computing systems 190 and the recipient applications 195 are inaccessible by users of the source computing systems 180 and the source computing services 185. For example, the computer-implemented functions provided by the recipient applications 195 are secured such that access is limited to the event restraint-delivery computing system 120. In FIG. 1, one or more additional computing systems not included in the event restraint-delivery computing system 120, such as personal computing devices of users for the source computing services 185, are prevented from accessing the recipient computing systems 190 and the recipient applications 195. In some implementations, the arrangement of computing systems described in regard to FIG. 1 provides improved security for one or more of the source computing systems 180, the source computing services 185, the recipient computing systems 190, or the recipient applications 195. For example, the event restraint-delivery computing system 120 can transform or otherwise analyze event data that is identified from the event stream 105, prior to providing the event data to one or more of the recipient computing systems 190. In some cases, transformation of the event data by the event restraint-delivery computing system 120 can reduce exposure of the recipient computing systems 190 and the recipient applications 195 to potentially malicious data, such as malicious code introduced in a user request submitted to the source computing services 185.

In FIG. 1, each of the source computing systems 180 generates multiple event data objects that are included in the event stream 105, such as respective event data objects that are generated for each request handled by each of the source computing services 185. Examples of event data objects can include data objects that describe requests previously received or handled by a source computing service, such as descriptions of requests related to login attempts, account generation (e.g., user accounts), website navigation, navigation of an online environment (e.g., gaming environment, virtual reality environment), order submission (e.g., online shopping orders), requests to open financial tradelines (e.g., monetary loans, bank accounts, utility accounts), or any other type of event data describing a request that has previously been received by a source computing service. Subsequent to receiving a request, a source computing service can use various techniques to handle the request, such as completing the request (e.g., performing one or more computing functions related to the request), refusing to perform the request (e.g., stopping or failing to perform one or more computing functions related to the request), placing the request in an error state, or other techniques by which the source computing service could handle the request.

In FIG. 1, each request received or handled by the source computing services 185 or source computing systems 180 is associated with at least one event data object, and the event data object describes the request and at least one outcome of the request, such as an outcome of how the request was handled (e.g., completed, refused, placed in an error state) by the source computing services 185 or the source computing systems 180. In some cases, event data objects include data, such as text data, that describes characteristics of a request that was previously received or handled, such as what the request was, what data was involved, whether the request was completed by the source computing service, whether an error condition resulted from the request, or other characteristics of a request to a source computing service. An example of an event data object describing a request could be a login event describing a login attempt, such as an event data object describing a login request submitted to a particular one of the source computing services 185. In this example of a login event, the particular one of the source computing services 185 may successfully complete the request (e.g., determine whether or not to allow the login), and the event data object describing the login event may include data that describes characteristics of the login event, such as a timestamp of the login request, a username utilized, a success or failure of the login request, or other characteristics. In some cases, one or more event data objects generated by the source computing services 185 include encrypted data, such as encrypted text data describing a username, a credit card number, address data, or other types of protected information. In addition, the event restraint-delivery computing system 120 may utilize a decryption technique to decrypt data included in an event data object identified from the event stream 105. In some cases, a particular request can be associated with multiple event data objects. For example, responsive to receiving a request to place an online shopping order, a particular one of the source computing services 185 may generate multiple event data objects related to verifying a payment method, verifying a billing address, verifying a shipping address, verifying an inventory of the purchased items, or other aspects of the example request to place the online shopping order.

In the computing environment 100, the event restraint-delivery computing system 120 receives each event data object included in the event stream 105, such as all event data objects generated by the source computing services 185. As noted above, the event stream 105 is high-volume (e.g., hundreds or thousands of event data objects are added each second) and continuous (e.g., event data objects are added or removed multiple times per second). In addition, the event restraint-delivery computing system 120 compares all event data objects to multiple criteria, such as criteria included in data comparison criteria sets 130. In the computing environment 100, the event restraint-delivery computing system 120 includes (or is otherwise capable of accessing) specialized computing resources (e.g., high-speed processing devices) capable of performing comparisons of each event data object included in the continuous high-volume event stream 105 with the multiple criteria in the data comparison criteria sets 130, such as performing comparisons of multiple criteria with hundreds or thousands of event data objects added or removed multiple times per second.

In FIG. 1, the data comparison criteria sets 130 include at least a first criteria set 132 and a second criteria set 134. In some cases, each criteria set included in the data comparison criteria sets 130 is associated with a respective one of the recipient computing systems 190 and at least one of the recipient applications 195 provided by the respective one of the recipient computing systems 190. For example, the first criteria set 132 is associated with a first recipient computing system of the recipient computing systems 190 and is also associated with a first recipient application of the recipient applications 195, the first recipient application provided by the first recipient computing system. In addition, the second criteria set 134 is associated with a second recipient computing system of the recipient computing systems 190 and is also associated with a second recipient application of the recipient applications 195, the second recipient application provided by the second recipient computing system.

Based on the comparisons of each event data object included in the event stream 105 with the data comparison criteria sets 130, the event restraint-delivery computing system 120 identifies one or more subsets of the event data objects from the event stream 105, such as a group of EDO subsets 110. In FIG. 1, the EDO subsets 110 include at least a first EDO subset 112 and a second EDO subset 114. For example, the event restraint-delivery computing system 120 identifies the first EDO subset 112 based on identifying one or more event data objects in the event stream 105 that match each criterion in the first criteria set 132. In addition, the event restraint-delivery computing system 120 identifies the second EDO subset 114 based on identifying one or more event data objects in the event stream 105 that match each criterion in the second criteria set 134. In the computing environment 100, each EDO subset in the group of EDO subsets 110 is associated with a respective one of the recipient computing systems 190 and at least one of the recipient applications 195 provided by the respective one of the recipient computing systems 190, such as a particular EDO subset that matches a particular criteria set associated with a respective recipient computing system and a recipient application. For example, the event restraint-delivery computing system 120 determines that the first EDO subset 112 is associated with the first recipient computing system and the first recipient application, based on the first EDO subset 112 matching the first criteria set 132. In addition, the event restraint-delivery computing system 120 determines that the second EDO subset 114 is associated with the second recipient computing system and the second recipient application, based on the second EDO subset 114 matching the second criteria set 134. In some cases, the event restraint-delivery computing system 120 identifies one or more EDO subsets in the group of EDO subsets 110 based on data output from at least one machine-learning model, such as further described in regard to FIG. 2.

In the computing environment 100, the event restraint-delivery computing system 120 generates restraint status data respectively corresponding to each EDO subset identified from the event stream 105, such as restraint status data 140 that includes at least first restraint status data 142 and second restraint status data 144. In addition, the restraint status data 140 indicates whether each corresponding EDO subset fulfills at least one trigger criterion for the recipient computing system or recipient application associated with the corresponding EDO subset. For example, the event restraint-delivery computing system 120 generates the first restraint status data 142 corresponding to the first EDO subset 112 and the second restraint status data 144 corresponding to the second EDO subset 114. In addition, the first restraint status data 142 indicates at least one trigger criterion for the first recipient computing system and the first recipient application associated with the first EDO subset 112. Furthermore, the second restraint status data 144 indicates at least one trigger criterion for the second recipient computing system and the second recipient application associated with the second EDO subset 114. Examples of trigger criteria can include a completeness (e.g., a quantity of event data objects included in a subset), an elapsed time (e.g., a quantity of seconds elapsed since identification of an initial event data object in a subset), receiving a particular event data object (e.g., an event data object indicating a completion of a multi-event request), an error condition (e.g., an expected event data object is not received), or other characteristics of an EDO subset corresponding to one or more trigger criteria.

Based on the indicated trigger criteria, the event restraint-delivery computing system 120 evaluates each of the restraint status data 140. In some cases, the event restraint-delivery computing system 120 evaluates a particular restraint status data in response to a modification of a corresponding EDO subset, such as determining that a particular one of the EDO subsets 110 is modified to include an additional event data object from the event stream 105. In addition, the event restraint-delivery computing system 120 withholds the EDO subsets 110 from the associated ones of the recipient computing systems 190 during evaluation of the restraint status data 140, such as withholding a particular one of the EDO subsets 110 until the corresponding restrained status data indicates that one or more trigger criteria are fulfilled. For example, based on a comparison of the particular EDO subset to trigger criteria in the corresponding portion of the restraint status data 140, the event restraint-delivery computing system 120 modifies the corresponding portion of the restraint status data 140 to indicate that the trigger criteria are fulfilled. Based on determining that the restraint status data 140 indicates fulfillment of trigger criteria corresponding to the particular EDO subset, the event restraint-delivery computing system 120 provides the particular EDO subset to the associated one of the recipient computing systems 190.

For example, the event restraint-delivery computing system 120 generates the first restraint status data 142 based on the first EDO subset 112. The event restraint-delivery computing system 120 withholds the first EDO subset 112 from the first recipient computing system and the first recipient application during generation and evaluation of the first restraint status data 142, such as until the first restraint status data 142 indicates that the trigger criteria associated with the first recipient computing system and the first recipient application are fulfilled. As an example, if the first restraint status data 142 indicates trigger criteria describing a particular period of time, e.g., three minutes, the event restraint-delivery computing system 120 withholds the first EDO subset 112 from the first recipient computing system and the first recipient application until an evaluation of the first restraint status data 142 indicates that the trigger criteria are fulfilled, e.g., three minutes have elapsed since identification of an initial event data object in the first EDO subset 112. Responsive to determining that the first restraint status data 142 is modified to indicate that the trigger criteria are fulfilled, the event restraint-delivery computing system 120 provides the first EDO subset 112 to the first recipient computing system.

In addition, the event restraint-delivery computing system 120 generates the second restraint status data 144 based on the second EDO subset 114. The event restraint-delivery computing system 120 withholds the second EDO subset 114 from the second recipient computing system and the second recipient application during generation and evaluation of the second restraint status data 144, such as until the second restraint status data 144 indicates that the trigger criteria associated with the second recipient computing system and the second recipient application are fulfilled. As another example, if the second restraint status data 144 indicates trigger criteria describing a particular quantity of event data objects, e.g., fifteen event data objects, the event restraint-delivery computing system 120 withholds the second EDO subset 114 from the second recipient computing system and the second recipient application until an evaluation of the second restraint status data 144 indicates that the trigger criteria are fulfilled, e.g., the second EDO subset 114 includes fifteen event data objects. Responsive to determining that the second restraint status data 144 is modified to indicate that the trigger criteria are fulfilled, the event restraint-delivery computing system 120 provides the second EDO subset 114 to the second recipient computing system.

In some cases, the event restraint-delivery computing system 120 modifies an EDO subset based on one or more transformation techniques, such as a transformation technique applied prior to providing the EDO subset to an associated one of the recipient computing systems 190. In some cases, a particular transformation technique is applied to the EDO subset based on a determination by the event restraint-delivery computing system 120 that the particular transformation technique is associated with a respective one of the recipient computing systems 190 and at least one of the recipient applications 195 provided by the respective one of the recipient computing systems 190. For example, the event restraint-delivery computing system 120 determines that the first recipient computing system is associated with a first transformation technique describing a particular communication channel, such as an application program interface ("API") that is utilized by the first recipient computing system. Responsive to determining that the first recipient computing system is associated with the first transformation technique, the event restraint-delivery computing system 120 modifies the first EDO subset 112 based on the first transformation technique, such as modifying a format of the first EDO subset 112 to have a format utilized by the particular communication channel. In addition, the event restraint-delivery computing system 120 determines that the second recipient computing system is associated with a second transformation technique describing a particular encryption technique that is utilized by the second recipient computing system. Responsive to determining that the second recipient computing system is associated with the second transformation technique, the event restraint-delivery computing system 120 modifies the second EDO subset 114 based on the second transformation technique, such as encrypting the second EDO subset 114 according to the particular encryption technique. Examples of transformation techniques can include selection of a communication channel (e.g., API, cellular data communication, virtual private connection, submission via a website form), formatting for a communication channel, applying an encryption technique (e.g., hashing, encoding, redaction), delimiting data (e.g., separating portions of data with a comma character), applying a data normalization technique, or other types of transformations that can modify an EDO subset for a particular recipient computing system or a particular recipient application.

In some implementations, applying one or more transformation techniques via the event restraint-delivery computing system 120 can improve code base consistency, such as by reducing manual efforts related to computer code implemented by one or more of the source computing systems 180 or the source computing services 185. In addition, applying one or more transformation techniques via the event restraint-delivery computing system 120 can improve computing resource usage, such as by reducing computing components (e.g., processors, memory components, storage components) related to executing computer code implemented by one or more of the source computing systems 180 or the source computing services 185. For example, the event restraint-delivery computing system 120 receives multiple event data objects from multiple ones of the source computing services 185. In addition, the event restraint-delivery computing system 120 determines, for each of the multiple event data objects, whether a respective recipient computing system or recipient service is associated with one or more respective transformation techniques for the multiple event data objects. In addition, the event restraint-delivery computing system 120, e.g., instead of each of the source computing systems 180 and the source computing services 185, determines which of the multiple event data objects requires the respective transformation techniques and modifies the multiple event data objects based on the respective transformation techniques to the multiple event data objects. In this example, the event restraint-delivery computing system 120 includes (or otherwise can access) a code base capable of determining the respective transformation techniques associated with a respective recipient computing system or recipient service, which may reduce expenditure of resources associated with the source computing systems 180 or the source computing services 185 (e.g., reduced manual efforts to maintain multiple code bases, reduced downtime related to code base maintenance, reduced computing storage and processing components to implement multiple code bases). In some implementations, such as implementations in which each of the source computing systems 180 is operated and maintained via a respective organization (e.g., a respective organization for each particular one of the source computing systems 180), determining and applying transformation techniques for the recipient computing systems 190 and the recipient applications 195 via the event restraint-delivery computing system 120 can provide significant improvements related to reduced manual efforts to maintain computing code bases and reduced computing resource usage, e.g., instead of each of the source computing systems 180 determining and applying transformation techniques for each of the recipient computing systems 190 and the recipient applications 195.

In the computing environment 100, the event restraint-delivery computing system 120 includes a ledger data repository 170. In addition, the event restraint-delivery computing system 120 modifies the ledger data repository 170 at least once for each event data object received via the event stream 105, such as modifying the ledger data repository 170 to include, for each received event data object, a respective event-specific data record that indicates (at least) an occurrence of the received event data object. For example, the event restraint-delivery computing system 120 modifies the ledger data repository 170 based on one or more of receiving a particular event data object, identifying an EDO subset that includes the particular event data object, performing a transformation of the particular event data object, or providing the particular event data object to a recipient application. In some cases, the event restraint-delivery computing system 120 modifies the ledger data repository 170 based on an error related to an event data object received via the event stream 105, such as based on one or more errors related to receiving a particular event data object that includes corrupted data, failing to identify a subset for a particular event data object, or failing to identify a change in restraint status data for a particular EDO subset (e.g., a trigger criteria is not fulfilled). In some cases, the event restraint-delivery computing system 120 modifies the ledger data repository 170 during monitoring of the event stream 105, such modifications that occur as the event restraint-delivery computing system 120 monitors each event data object in the event stream 105 (e.g., continuous modifications). In FIG. 1, the ledger data repository 170 is a specialized database component (or components) capable of writing large quantities of ledger data at high speed, such as in response to multiple modifications made by the event restraint-delivery computing system 120 based on each event data object received via the high-volume event data stream 105. An example of a database technique that can be used to implement the ledger data repository 170 includes a NoSQL columnar database, but other database techniques for writing large quantities of data at high speed could be used. FIG. 1 depicts the ledger data repository 170 as being included in the event restraint-delivery computing system 120, but other implementations are possible. For example, an event restraint-delivery computing system could access a ledger data repository implemented by an additional computing system, such as access via one or more computing networks.

In some implementations, the event restraint-delivery computing system 120 identifies a potential event pattern based on analysis of some or all of the event data objects included in the event stream 105. Responsive to identifying the potential event pattern, the event restraint-delivery computing system 120 generates alert data, such as alert data 125. In addition, the event restraint-delivery computing system 120 may provide the alert data 125 to at least one additional computing system. For example, the event restraint-delivery computing system 120 analyzes multiple event data objects received via the event stream 105. In addition, the event restraint-delivery computing system 120 identifies one or more characteristics of the analyzed event data objects, e.g., characteristics in addition to the data comparison criteria sets 130 or trigger criteria associated with the restraint status data 140. In some cases, the event restraint-delivery computing system 120 identifies the one or more characteristics in event data objects that are included in multiple EDO subsets. For example, the event restraint-delivery computing system 120 determines that the event stream 105 includes a relatively large quantity of event data objects (e.g., a quantity above a threshold value, a quantity received during a threshold period of time) that include a particular data item. In some cases, the particular data item describes sensitive information, such as a credit card number, a social security number, an address, a name, or other types of sensitive information or potentially sensitive information. In some cases, the particular data item is encrypted or otherwise modified, such as an encrypted version of sensitive information. In addition, the event restraint-delivery computing system 120 determines that the relatively large quantity of event data objects which include the particular data item are associated with multiple sources or multiple recipients, such as event data objects received from multiple ones of the source computing systems 180 or multiple ones of the source computing services 185, or event data objects that are associated with (e.g., match one or more of the data comparison criteria sets 130) multiple ones of the recipient computing systems 190 or multiple ones the recipient applications 195.

As an example, the event restraint-delivery computing system 120 determines that a particular social security number (e.g., an encrypted version of a social security number) is included in event data objects that are associated with multiple different ones of the source computing systems 180. In this example, the event restraint-delivery computing system 120 also determines that the event data objects which include the particular social security number are related to financial account requests that are handled by the multiple different ones of the source computing systems 180, e.g., the particular social security number is involved in a relatively large quantity of requests to open financial accounts. Continuing with this example, the event restraint-delivery computing system 120 determines that the event data objects which include the particular social security number may be part of a potential event pattern involving fraudulent use of the particular social security number. The event restraint-delivery computing system 120 can identify the potential event pattern based on an output from a machine learning model, identifying that the quantity of the event data objects exceeds a fraud threshold value, or other techniques to determine a potential event pattern. In this example, the event restraint-delivery computing system 120 generates the alert data 125 and provide it to the multiple different ones of the source computing systems 180 which generated the event data objects including the particular social security number. In addition, the multiple different ones of the source computing systems 180 may be configured to perform one or more computing functions in response to receiving the alert data 125, such as implementing one or more anti-fraud security techniques (e.g., cancelling a requested account, requesting additional information to verify a request). In this example, the event restraint-delivery computing system 120 identifies a potential event pattern that involves fraudulent use of the particular social security number, but other types of potential event pattern can be identified by an event restraint-delivery computing system, such as potential event patterns involving computing system attacks (e.g., distributed denial of service attacks), fraudulent utility use (e.g., cell phone account fraud, unmetered electricity usage), or other types of potential event patterns involving event data that describes requests received or handled by multiple source computing systems or multiple source computing services.

In some implementations, the event restraint-delivery computing system 120 improves identification of potential event patterns that involve multiple ones of the source computing systems 180 or the source computing services 185, or multiple ones of the recipient computing systems 190 or the recipient applications 195. For example, the event restraint-delivery computing system 120 can identify, with improved accuracy, potential event patterns that are distributed, such as potential event patterns involving a large quantity of the source computing systems 180 that each respectively receives a small quantity of requests (e.g., requests to open a financial account). Based on event data objects generated by the large quantity of the source computing systems 180, the event restraint-delivery computing system 120 can identify a distributed potential event pattern with improved accuracy as compared to the source computing systems 180, each one of which has insufficient data (e.g., the respective small quantities of requests) to identify the potential event pattern. In addition, the event restraint-delivery computing system 120 can improve security for the source computing systems 180 or the source computing services 185, such as by providing the alert data 125 to the source computing systems 180 based on an identified distributed potential event pattern.

In some cases, an event restraint-delivery computing system identifies one or more subsets of event data objects from an event data stream based on one or more machine-learning models that are applied to some or all event data objects in the event data stream. For example, the event data stream is a high-volume, continuous event data stream that includes event data objects received from multiple different source computing systems or source computing services. In addition, the one or more machine-learning models could generate one or more outputs that describe a group of the event data objects from the event data stream, such as outputs that indicate a classification, a characteristic, or other output types that describe an event data object. Based on the one or more outputs from the machine-learning models, the event restraint-delivery computing system can determine whether the group of event data objects (or a portion of the group) is identified for inclusion in an EDO subset. In some cases, the event restraint-delivery computing system identifies one or more potential event patterns based on an output from at least one machine-learning model.

FIG. 2 depicts an example of a computing environment 200 in which an event restraint-delivery computing system 220 determines one or more types of classifications for a subset of event data objects. FIG. 3 is a diagram depicting an example timeline during which the event restraint-delivery computing system 220 receives, determines one or more classifications, and delivers multiple EDO subsets. In some cases, the event restraint-delivery computing system 220 includes at least one trained machine-learning model, such as a trained machine-learning model 250, that is trained to determine one or more characteristics of an event data object, such as grouping characteristics that indicate a potential classification for an event data object. Examples of machine-learning models included in an event restraint-delivery computing system can include XGBoost, a Random Forest model, a decision tree, or other types of machine-learning models that can be trained to determine characteristics or classifications for an event data object. Based on the determined characteristics, the trained machine-learning model 250 generates one or more types of output data, such as classification output data 255. In addition, the event restraint-delivery computing system 220 determines one or more classifications based on the classification output data 255 or additional output data generated by the trained machine-learning model 250. In some cases, the event restraint-delivery computing system 220 coordinates delivery of multiple subsets of event data objects among multiple computing systems based at least in part on classifications that are determined for the multiple subsets of event data objects. The computing environment 200 includes the event restraint-delivery computing system 220, a group of multiple source computing systems 280, and a group of multiple recipient computing systems 290. In addition, the computing environment 200 includes a high-volume event data stream 205 (also referred to herein as "event stream 205"), from which the event restraint-delivery computing system 220 identifies multiple EDO subsets. In FIG. 2, the event stream 205 is a high-volume and continuous event stream, such as described regarding the event stream 105 depicted in FIG. 1. For example, the event stream 205 is a high-volume and continuous event stream in which hundreds or thousands (or more) of event data objects are generated each second or changed multiple times per second. FIG. 3 diagrammatically depicts a small portion of event data objects received by the event restraint-delivery computing system 220 in the event stream 205. While FIG. 3 depicts only a few event data objects received by the event restraint-delivery computing system 220 in the event stream 205, it would be appreciated by one of ordinary skill in the art that the concepts depicted in FIG. 3 are intended to represent a portion of hundreds or thousands (or more) of event data objects included in the event stream 205.

In the computing environment 200, each source computing system included in the group of source computing systems 280 provides one or more computer-implemented services, such as described in regard to the source computing systems 180 and source computing services 185 depicted in FIG. 1. In addition, the group of source computing systems 280 includes at least a first source computing system 282, which provides at least a first source computing service 283, and a second source computing system 284, which provides at least a second source computing service 285. In some implementations, the group of source computing systems 280 includes one or more additional source computing systems, each of which respectively provides at least one additional source computing service. In addition, each of the source computing systems 280 generates event data, such as one or more event data objects, describing requests that are received or handled by the source computing systems 280, such as requests received from personal computing devices of users utilizing the source computing services of the source computing systems 280. For example, based on requests handled by the first source computing service 283, the first source computing system 282 generates multiple event data objects and provides the event data objects to the event restraint-delivery computing system 220 via the event stream 205. In addition, based on requests handled by the second source computing service 285, the second source computing system 284 generates multiple event data objects and provides the event data objects to the event restraint-delivery computing system 220 via the event stream 205. As described herein, inclusion of one or more event data objects in the event stream 205 indicates that the one or more event data objects are provided to the event restraint-delivery computing system 220, such as submission by one or more of the source computing systems 280 that generate the one or more event data objects.

In the computing environment 200, each recipient computing system in the group of recipient computing systems 290 provides one or more computer-implemented applications, such as described in regard to the recipient computing systems 190 and recipient applications 195 depicted in FIG. 1. In addition, the group of recipient computing systems 290 includes at least a first recipient computing system 292, which provides at least a first recipient application 293, and a second recipient computing system 294, which provides at least a second recipient application 295. In some implementations, the group of recipient computing systems 290 includes one or more additional recipient computing systems, each of which respectively provides at least one additional recipient application. In some cases, recipient applications provided by the recipient computing systems 290 generate one or more data outputs based on EDO subsets that are generated and provided by the event restraint-delivery computing system 220. In addition, one or more of the recipient computing systems 290 can be configured to provide generated data outputs to the event restraint-delivery computing system 220 or to an additional computing system. For example, the recipient computing system 292 receives at least one EDO subset generated by the event restraint-delivery computing system 220, such as a first EDO subset 212. Based on the EDO subset 212, the recipient application 293 generates at least one data output. The recipient computing system 292 provides the at least one data output to at least one additional computing system, such as the event restraint-delivery computing system 220 or another computing system included in (or in communication with) the computing environment 200. In addition, the recipient computing system 294 receives at least one EDO subset generated by the event restraint-delivery computing system 220, such as a second EDO subset 214. Based on the EDO subset 214, the recipient application 295 generates at least one data output. The recipient computing system 294 provides the at least one data output to at least one additional computing system, such as the event restraint-delivery computing system 220 or another computing system included in (or in communication with) the computing environment 200.

Examples of data outputs from the recipient applications 293 or 295 can include a data output indicating a decision to permit or deny access to a computing application (e.g., a recipient application provided by one of the recipient computing systems 290), a data output indicating a risk evaluation result (e.g., a potential fraud pattern is evaluated as having a statistical risk), or other types of data outputs.

In the computing environment 200, the event restraint-delivery computing system 220 includes multiple data comparison criteria sets (such as described regarding the data comparison criteria sets 130 depicted in FIG. 1) that are associated with respective ones of the recipient computing systems 290. For example, the event restraint-delivery computing system 220 includes a first criteria set 232 associated with the first recipient computing system 292 and the first recipient application 293, and a second criteria set 234 associated with the second recipient computing system 294 and the second recipient application 295. In addition, the event restraint-delivery computing system 220 identifies multiple EDO subsets, such as the first EDO subset 212 and the second EDO subset 214, based on comparisons of each event data object in the event stream 205 with each of the multiple data comparison criteria sets, including the first criteria set 232 and the second criteria set 234.

In the computing environment 200, the event restraint-delivery computing system 220 generates restraint status data (such as described regarding the restraint status data 140 depicted in FIG. 1) respectively corresponding to each EDO subset that is identified from the event stream 205. In addition, the event restraint-delivery computing system 220 generates (or modifies) the restraint status data to indicate whether each corresponding EDO subset fulfills at least one trigger criterion for a particular recipient computing system or recipient application associated with the corresponding EDO subset. For example, the event restraint-delivery computing system 220 generates first restraint status data 242 corresponding to the first EDO subset 212 and second restraint status data 244 corresponding to the second EDO subset 214. In addition, the event restraint-delivery computing system 220 generates or modifies the first restraint status data 242 to indicate whether the first EDO subset 212 fulfills one or more trigger criteria associated with the first recipient computing system 292 or the first recipient application 293. In addition, the event restraint-delivery computing system 220 generates or modifies the second restraint status data 244 to indicate whether the second EDO subset 214 fulfills one or more trigger criteria associated with the second recipient computing system 294 or the second recipient application 295.

In FIG. 2, the event restraint-delivery computing system 220 determines at least one classification of each event data object in the event stream 205, such as classifications based on the classification output data 255 from the trained machine-learning model 250. In addition, the trained machine-learning model 250 generates the classification output data 255 (or respective portions thereof) responsive to each event data object that is received in the event stream 205, i.e., generating respective portions of output data for each of hundreds or thousands (or more) of event data objects each second. Examples of classifications determined by a trained machine-learning model in an event restraint-delivery computing system can include classification output data indicating a probable source computing system, a probable source computing service, a probable request characteristic (e.g., potential characteristics of a request from which an event data object was generated), a fraud risk value, or other output data indicating types of classifications for an event data object. In some cases, the event restraint-delivery computing system 220 determines at least one classification of a particular event data object based on a comparison of the classification output data 255 with the particular event data object, such as comparing a characteristic included with the particular event data object (e.g., header data describing a source computing system) with a classification determined by the trained machine-learning model 250 (e.g., output data indicating a probable source computing system). In some cases, the event restraint-delivery computing system 220 identifies an EDO subset for the particular event data object based on one or more of a characteristic of the particular event data object, a classification for the particular event data object, or a comparison of the characteristic with the classification. For example, the event restraint-delivery computing system 220 determines that, based on a comparison indicating that the particular event data object has header data describing a source computing system different from a probable source computing system identified in the classification output data 255, the particular event data object matches at least one criterion in a particular criteria set for a particular one of the recipient computing systems 290 that is configured to perform computing functions to verify event data objects with a relatively high fraud risk. Responsive to determining that the particular event data object matches the at least one criterion, the event restraint-delivery computing system 220 includes the particular event data object in a higher-risk EDO subset, e.g., a subset identified for event data objects with a relatively high fraud risk. In addition, the event restraint-delivery computing system 220 can provide the higher-risk EDO subset to the particular one of the recipient computing systems 290, which may then perform one or more computing functions to verify the particular event data object. In some implementations, determining a classification of an event data object based on output data from a trained machine-learning model can improve fraud detection or mitigation provided by the event restraint-delivery computing system 220, such as reducing a timeframe for identifying potential fraud in event data.

In the computing environment 200, the event restraint-delivery computing system 220 includes one or more transformation techniques that are associated with particular ones of the recipient computing systems 290 or included recipient applications, such as transformation technique data 222 that is associated with the recipient computing system 292 and the recipient application 293. In addition, the event restraint-delivery computing system 220 modifies one or more EDO subsets based on the transformation technique data 222, such as a transformation prior to providing the one or more EDO subsets to the recipient computing system 292. For example, the event restraint-delivery computing system 220 determines that the transformation technique data 222 describes a particular API used by the recipient application 293. In addition, the event restraint-delivery computing system 220 modifies the EDO subset 212 based on the transformation technique data 222, such as by modifying the EDO subset 212 to have a particular data format (or other aspects) utilized by the particular API. In some cases, the event restraint-delivery computing system 220 applies the transformation technique data 222 to the EDO subset 212 responsive to evaluating that the restraint status data 242, e.g., determining that the EDO subset 212 fulfills a trigger criterion associated with the recipient application 293. In some cases, the event restraint-delivery computing system 220 performs multiple modifications of the EDO subset 212 based on the transformation technique data 222 or other transformation techniques associated with the recipient computing system 292 and the recipient application 293, such as encrypting (or otherwise modifying) the EDO subset 212 or included data based on an encryption key utilized by the recipient application 293.

In FIG. 2, the event restraint-delivery computing system 220 identifies one or more potential event patterns based on some or all of the event data objects included in the event stream 205. In some cases, the event restraint-delivery computing system 220 generates alert data, such as alert data 225, responsive to identifying a potential event pattern (such as described regarding the alert data 125 depicted in FIG. 1). In addition, the event restraint-delivery computing system 220 can provide the alert data 225 to at least one additional computing system, such as to one or more computing systems in the source computing systems 280 or the recipient computing systems 290. In some implementations, the event restraint-delivery computing system 220 identifies a potential event pattern responsive to evaluating one or more portions of restraint status data. In addition, the event restraint-delivery computing system 220 provides one or more EDO subsets to at least one of the recipient computing systems 290 based on an identified potential event pattern, such as responsive to determining that the potential event pattern fulfills one or more trigger criteria included in (or associated with) restraint status data. As an example, the event restraint-delivery computing system 220 identifies multiple event data objects for inclusion in the EDO subset 212, based on comparisons of the one or more event data objects with the criteria set 232. In this example, the criteria set 232 includes one or more data comparison criteria that are related to fraud detection, such as a criterion for identifying an event data object that indicates use of a social security number, a criterion for identifying an event data object that indicates opening a financial account, or other criteria for identifying event data objects generated based on requests (e.g., requests handled by the source computing system 280) that could be potentially fraudulent requests. Continuing with this example, the event restraint-delivery computing system 220 identifies a quantity of event data objects for inclusion in the EDO subset 212. In addition, the event restraint-delivery computing system 220 evaluates the restraint status data 242 corresponding to the EDO subset 212. Based on the evaluation, the event restraint-delivery computing system 220 identifies a change in the restraint status data 242, such as a change based on fulfillment of a first trigger criterion associated with the recipient computing system 292. In this example, the event restraint-delivery computing system 220 determines that the first trigger criterion indicates a potential event pattern, such as a potential event pattern in which a threshold quantity (e.g., a threshold indicated by the first trigger criterion) of event data objects indicating use of a social security number are received by the event restraint-delivery computing system 220. Responsive to determining that the first trigger criterion indicating the potential event pattern is fulfilled, the event restraint-delivery computing system 220 provides the EDO subset 212 to at least one associated computing system, such as the recipient computing system 292.

FIG. 3 depicts an example timeline during which the event restraint-delivery computing system 220 determines at least one classification for each event data object included in the first EDO subset 212 and the second EDO subset 214. To aid comprehension, additional event data objects received by the event restraint-delivery computing system 220 in the event stream 205 are not depicted in FIG. 3, although the event restraint-delivery computing system 220 and the trained machine-learning model 250 perform techniques to determine classifications and identify EDO subsets for each event data object that is received in the event stream 205. In FIG. 3, the example timeline includes a timestep 301, a timestep 302, a timestep 303, and a timestep 304, and one or more additional timesteps prior to the timestep 301 or subsequent to the timestep 304. In FIG. 3, each of the timesteps 301, 302, 303, and 304 represents one second of time but other implementations are possible (e.g., timesteps of milliseconds, timesteps of minutes).

In the computing environment 200, the event restraint-delivery computing system 220 receives, in the event stream 205 and at the timestep 301, an event data object 383*a* generated by the first source computing service 283. During the timestep 301, the event restraint-delivery computing system 220 applies the trained machine-learning model 250 to the event data object 383*a*, receives a portion of the classification output data 255 describing the event data object 383*a*, identifies the EDO subset 212 as including the event data object 383*a*, and evaluates the restraint status data 242 corresponding to the EDO subset 212. For example, the event restraint-delivery computing system 220 provides the event data object 383*a* to the trained machine-learning model 250, which generates a first portion of the classification output data 255 describing the event data object 383*a*. In addition, the event restraint-delivery computing system 220 receives the first portion of the classification output data 255 as a data output from the trained machine-learning model 250. Based on the first portion of the classification output data 255, the event restraint-delivery computing system 220 determines one or more classifications of the event data object 383*a*. In addition, based at least in part on the one or more classifications, the event restraint-delivery computing system 220 identifies that the event data object 383*a* is included in the EDO subset 212, such as by comparing the classifications of the event data object 383*a* with the criteria set 232. In some cases, during the timestep 301 the event restraint-delivery computing system 220 generates or modifies a particular version of the EDO subset 212 based on the identification, such as an EDO subset 212' that includes the event data object 383*a*. In addition, the event restraint-delivery computing system 220 generates or evaluates the restraint status data 242 corresponding to the EDO subset 212, such as evaluating if the EDO subset 212' fulfills a first trigger criterion associated with the recipient application 293. In this example, based on the evaluation at timestep 301 the event restraint-delivery computing system 220 determines that the restraint status data 242 does not indicate that the first trigger criterion is fulfilled. Responsive to determining that the first trigger criterion is not fulfilled, the event restraint-delivery computing system 220 withholds the EDO subset 212 (e.g., the EDO subset 212' at timestep 301) from the recipient computing system 292 and the recipient application 293.

In addition, during the timestep 301 and for all (i.e., hundreds or thousands) additional event data objects that are received during the timestep 301, the event restraint-delivery computing system 220 performs additional techniques, such as applying the trained machine-learning model 250, receiving respective portions of the classification output data 255, identifying respective EDO subsets, and evaluating restraint status data corresponding to the respective EDO subsets.

Continuing with the example timeline depicted in FIG. 3, the event restraint-delivery computing system 220 receives, in the event stream 205 and at the timestep 302, an event data object 385*a* generated by the second source computing service 285. During the timestep 302, the event restraint-delivery computing system 220 applies the trained machine-learning model 250 to the event data object 385*a*, receives a portion of the classification output data 255 describing the event data object 385*a*, identifies the EDO subset 212 as including the event data object 385*a*, and evaluates the restraint status data 242 corresponding to the EDO subset 212. For example, the event restraint-delivery computing system 220 provides the event data object 385*a* to the trained machine-learning model 250, which generates a second portion of the classification output data 255 describing the event data object 385*a*. In addition, the event restraint-delivery computing system 220 receives the second portion of the classification output data 255 as a data output from the trained machine-learning model 250. Based on the second portion of the classification output data 255, the event restraint-delivery computing system 220 determines one or more classifications of the event data object 385*a*. In addition, based at least in part on the one or more classifications, the event restraint-delivery computing system 220 identifies that the event data object 385*a* is included in the EDO subset 212, such as by comparing the classifications of the event data object 385*a* with the criteria set 232. In some cases, during the timestep 302 the event restraint-delivery computing system 220 generates or modifies a particular version of the EDO subset 212 based on the identification, such as an EDO subset 212" that includes the event data object 385*a* and the event data object 383*a*. In addition, the event restraint-delivery computing system 220 evaluates the restraint status data 242 corresponding to the EDO subset 212, such as evaluating if the EDO subset 212" fulfills the first trigger criterion associated with the recipient application 293. In this example, based on the evaluation at timestep 302 the event restraint-delivery computing system 220 determines that the restraint status data 242 does not indicate that the first trigger criterion is fulfilled. Responsive to determining that the first trigger criterion is not fulfilled, the event restraint-delivery computing system 220 withholds the EDO subset 212 (e.g., the EDO subset 212" at timestep 302) from the recipient computing system 292 and the recipient application 293.

Continuing with the example timeline depicted in FIG. 3, the event restraint-delivery computing system 220 receives, in the event stream 205 and at the timestep 303, an event data object 383*b* generated by the first source computing service 283 and an event data object 385*b* generated by the second source computing service 285. During the timestep 303, the event restraint-delivery computing system 220 applies the trained machine-learning model 250 to the event data object 383*b* and the event data object 385*b*, receives respective portions of the classification output data 255 describing the event data object 383*b* and the event data object 385*b*, identifies the EDO subset 212 as including the event data object 383*b* and the EDO subset 214 as including the event data object 385*b*, and evaluates the restraint status data 242 corresponding to the EDO subset 212 and the restraint status data 244 corresponding to the EDO subset 214. For example, the event restraint-delivery computing system 220 provides the event data object 383*b* and the event data object 385*b* to the trained machine-learning model 250, which generates a third portion of the classification output data 255 describing the event data object 383*b* and a fourth portion of the classification output data 255 describing the event data object 385*b*. In addition, the event restraint-delivery computing system 220 receives the third and fourth portions of the classification output data 255 as a data output from the trained machine-learning model 250.

Based on the third and fourth portions of the classification output data 255, the event restraint-delivery computing system 220 determines one or more classifications of the event data object 383*b* and the event data object 385*b*. In addition, based at least in part on the one or more classifications, the event restraint-delivery computing system 220 identifies that the event data object 383*b* is included in the EDO subset 212 and the event data object 385*b* is included in the EDO subset 214, such as by comparing the classifications of the event data object 383*b* and the event data object 385*b* with the criteria set 232 and the criteria set 234. In some cases, during the timestep 303 the event restraint-delivery computing system 220 generates or modifies a particular version of the EDO subset 212 and a particular version of the EDO subset 214 based on the identification. For example, the event restraint-delivery computing system 220 modifies an EDO subset 212''' that includes the event data object 383*b*, the event data object 385*a*, and the event data object 383*a*. The event restraint-delivery computing system 220 also generates or modifies an EDO subset 214' that includes the event data object 385*b*. In addition, the event restraint-delivery computing system 220 evaluates the restraint status data 242 corresponding to the EDO subset 212 and the restraint status data corresponding to the EDO subset 214, such as evaluating if the EDO subset 212'' fulfills the first trigger criterion associated with the recipient application 293 and evaluating if the EDO subset 214' fulfills a second trigger criterion associated with the recipient application 295. In this example, based on the evaluation at timestep 303 the event restraint-delivery computing system 220 determines that the restraint status data 242 indicates that the first trigger criterion is fulfilled. Responsive to determining that the first trigger criterion is fulfilled, the event restraint-delivery computing system 220 provides the EDO subset 212 (e.g., the EDO subset 212'' at timestep 303) to the recipient computing system 292 and the recipient application 293. Also in this example, based on the evaluation at timestep 303 the event restraint-delivery computing system 220 determines that the restraint status data 244 does not indicate that the second trigger criterion is fulfilled. Responsive to determining that the second trigger criterion is not fulfilled, the event restraint-delivery computing system 220 withholds the EDO subset 214 (e.g., the EDO subset 214' at timestep 303) from the recipient computing system 294 and the recipient application 295.

In some implementations, withholding an EDO subset from a recipient computing system or a recipient application prior to fulfillment of a trigger criterion improves accuracy or timeliness of computing functions provided by the recipient computing system or recipient application. For example, by withholding the EDO subset 212 until the first trigger criterion is fulfilled, the event restraint-delivery computing system 220 may reduce a likelihood that the recipient application 293 could generate data (e.g., a false positive, a false negative) based on insufficient data or inaccurate data. In addition, by providing the EDO subset 212 based on the first trigger criterion being fulfilled, the event restraint-delivery computing system 220 may increase a likelihood that the recipient application 293 generates an output (e.g., a fraud risk probability value) in a relatively short period of time, such as providing the EDO subset 212 within three seconds (e.g., a combined duration of the timesteps 301, 302, and 303) after receiving the event data object 383*a* at the timestep 301. In some cases, the event restraint-delivery computing system 220 improves responsiveness of the recipient applications 293 or 295 to event data in the event stream 205, such as by classifying the high-volume event data and identifying EDO subsets within seconds (or other timestep periods) of receiving the high-volume event data, and providing the EDO subsets to the recipient computing systems 292 or 294 for use in one or more computing functions by the recipient applications 293 or 295.

Continuing with the example timeline depicted in FIG. 3, the event restraint-delivery computing system 220 receives, in the event stream 205 and at the timestep 304, an event data object 383*c* generated by the first source computing service 283 and an event data object 385*c* generated by the second source computing service 285. During the timestep 303, the event restraint-delivery computing system 220 applies the trained machine-learning model 250 to the event data object 383*c* and the event data object 385*c*, receives respective portions of the classification output data 255 describing the event data object 383*c* and the event data object 385*c*, identifies the EDO subset 214 as including the event data object 383*c* and the event data object 385*c*, and evaluates the restraint status data 244 corresponding to the EDO subset 214. For example, the event restraint-delivery computing system 220 provides the event data object 383*c* and the event data object 385*c* to the trained machine-learning model 250, which generates a fifth portion of the classification output data 255 describing the event data object 383*c* and a sixth portion of the classification output data 255 describing the event data object 385*c*. In addition, the event restraint-delivery computing system 220 receives the fifth and sixth portions of the classification output data 255 as a data output from the trained machine-learning model 250. Based on the fifth and sixth portions of the classification output data 255, the event restraint-delivery computing system 220 determines one or more classifications of the event data object 383*c* and the event data object 385*c*. In addition, based at least in part on the one or more classifications, the event restraint-delivery computing system 220 identifies that the event data object 383*c* and the event data object 385*c* are included in the EDO subset 214, such as by comparing the classifications of the event data object 383*c* and the event data object 385*c* with the criteria set 234. In some cases, during the timestep 303 the event restraint-delivery computing system 220 generates or modifies a particular version of the EDO subset 214 based on the identification. For example, the event restraint-delivery computing system 220 modifies an EDO subset 214'' that includes the event data object 383*c*, the event data object 385*c*, and the event data object 385*b*. In addition, the event restraint-delivery computing system 220 evaluates the restraint status data corresponding to the EDO subset 214, such as evaluating if the EDO subset 214' fulfills the second trigger criterion associated with the recipient application 295. In this example, based on the evaluation at timestep 304 the event restraint-delivery computing system 220 determines that the restraint status data 244 does not indicate that the second trigger criterion is fulfilled. Responsive to determining that the second trigger criterion is not fulfilled, the event restraint-delivery computing system 220 withholds the EDO subset 214 (e.g., the EDO subset 214'' at timestep 304) from the recipient computing system 294 and the recipient application 295. In some implementations, based on an evaluation of the restraint status data 244 at an additional timestep (e.g., subsequent to the timestep 304), the event restraint-delivery computing system 220 determines that the restraint status data 244 indicates that the second trigger criterion is fulfilled, and provides the EDO subset 214 (e.g., a version of the EDO subset 214 at the additional timestep) to the recipient computing system 294 and the recipient application 295.

In addition, during each of the timesteps 302, 303, and 304 and for all (i.e., hundreds or thousands) additional event data objects that are respectively received during each of the timesteps 302, 303, and 304, the event restraint-delivery computing system 220 performs additional techniques at each respective timestep, such as applying the trained machine-learning model 250, receiving respective portions of the classification output data 255, identifying respective EDO subsets, and evaluating restraint status data corresponding to the respective EDO subsets.

In some implementations, the event restraint-delivery computing system 220 improves data security of event data included in the event stream 205, such as by withholding multiple event data objects from one or more computing systems that lack criteria sets matching the multiple event data objects. For example, the event restraint-delivery computing system 220 compares one or more of the event data objects 383a, 385a, or 383b (e.g., included in the EDO subset 212) with the criteria set 234 (e.g., associated with the recipient computing system 294 or the recipient application 295). Responsive to determining that none of the event data objects 383a, 385a, or 383b match a criterion in the criteria set 234, the event restraint-delivery computing system 220 withholds the EDO subset 212 from the recipient computing system 294 and the recipient application 295. In some cases, withholding EDO subsets from one or more recipient computing systems improves security of event data objects included in the subsets, such as by reducing or eliminating transmission of the EDO subsets to a recipient computing system that is unassociated (e.g., lacks a matching criteria set) with the EDO subsets. In some cases, withholding EDO subsets from one or more recipient computing systems improves accuracy of output from one or more recipient applications provided by the one or more recipient computing systems, such as by reducing or eliminating event data objects which include data that is disruptive (e.g., malicious code strings) or irrelevant to a computing function provided by a recipient application.

FIG. 4 is a flow chart depicting an example of a process 400 for generating multiple subsets of event data objects and coordinating delivery of the multiple subsets among multiple computing systems. In some embodiments, such as described in regards to FIGS. 1-3, a computing device executing an event restraint-delivery computing system implements operations described in FIG. 4, by executing suitable program code. For illustrative purposes, the process 400 is described with reference to the examples depicted in FIGS. 1-3. Other implementations, however, are possible.

At block 410, the process 400 involves monitoring a high-volume event data stream, such as monitoring by an event restraint-delivery computing system. In addition, the high-volume event data stream includes multiple event data objects, such as event data objects that are received by the event restraint-delivery computing system from one or more additional computing systems. For example, the event restraint-delivery computing system 220 monitors the event stream 205 that includes multiple event data objects received from the source computing systems 280. In some implementations, the high-volume event data stream monitored by the event restraint-delivery computing system is modified hundreds or thousands of times per second to include hundreds or thousands of event data objects that are added each second. In some implementations, the high-volume event data stream monitored by the event restraint-delivery computing system is continuous (e.g., a high-volume continuous event data stream) in which event data objects are added or removed multiple times per second.

At block 420, the process 400 involves comparing, by the event restraint-delivery computing system, some or all of the monitored event data objects in the high-volume event data stream with at least one set of criteria, such as a first set of criteria associated with a first recipient computing system. In some cases, the event restraint-delivery computing system compares each event data object that is included in the high-volume event data stream with at least one set of criteria. In some cases, the event restraint-delivery computing system compares each event data object that is included in the high-volume event data stream during a particular timestep, e.g., comparing all event data objects included in the high-volume event data stream during a one-second time period, with at least one set of criteria. For example, the event restraint-delivery computing system 220 compares each event data object in the event stream 205 with the criteria set 232 and the criteria set 234.

At block 430, the process 400 involves identifying, by the event restraint-delivery computing system, at least one subset of event data objects from the monitored event data objects in the high-volume event data stream. In addition, the event restraint-delivery computing system identifies that each event data object in the subset of event data objects matches at least one set of criteria, such as a first subset of event data objects that matches the first set of criteria associated with the first recipient computing system. For example, the event restraint-delivery computing system 220 identifies that the EDO subset 212 includes each of the event data objects 383a, 385a, and 383b responsive to determining a match between one or more characteristics (e.g., a classification determined based on an output from the trained machine-learning model 250) of the event data objects 383a, 385a, and 383b and the criteria set 232. In addition, the event restraint-delivery computing system 220 identifies that the EDO subset 214 includes each of the event data objects 385b, 383c, and 385c responsive to determining a match between one or more characteristics of the event data objects 385b, 383c, and 385c and the criteria set 234.

At block 440, the process 400 involves evaluating, by the event restraint-delivery computing system, restraint status data that corresponds to the at least one subset of event data objects, such as respective restraint status data for each identified EDO subset. In some cases, the event restraint-delivery computing system evaluates restraint status data for a particular EDO subset based on one or more trigger criteria associated with the particular EDO subset, such as a trigger criterion for a recipient computing system associated with the particular EDO subset. In some cases, the trigger criterion is included in, or otherwise associated with, the restraint status data. For example, the event restraint-delivery computing system 220 evaluates the restraint status data 242 corresponding to the EDO subset 212, based on at least one trigger criterion associated with the restraint status data 242. In addition, the event restraint-delivery computing system 220 evaluates the restraint status data 244 corresponding to the EDO subset 214, based on at least one trigger criterion associated with the restraint status data 244.

At block 455, the process 400 involves determining, by the event restraint-delivery computing system, whether the at least one subset of event data objects fulfills the one or more trigger criteria associated with the respective restraint status data for the at least one subset of event data objects. In some cases, based on the determining, the event restraint-delivery computing system identifies a modification in the respective restraint status data for the at least one subset of event data objects, such as identifying that the respective restraint status data is modified from an incomplete status (e.g., the trigger criteria are not fulfilled) to a complete status (e.g., the trigger criteria are fulfilled). For example, the event restraint-delivery computing system 220 determines whether the EDO subset 212 fulfills the trigger criterion associated with the restraint status data 242. In addition, the event restraint-delivery computing system 220 determines whether the EDO subset 214 fulfills the trigger criterion associated with the restraint status data 244. In some cases, the event restraint-delivery computing system 220 identifies a modification to one or more of the restraint status data 242 or 244, such as a modification from an incomplete status to a complete status for one or more of the EDO subsets 212 or 214.

If operations related to block 455 determine that the at least one subset of event data objects does not fulfill the one or more trigger criteria, the process 400 proceeds to another block, such as block 450. If operations related to block 445 determine that the at least one subset of event data objects fulfills the one or more trigger criteria, the process 400 proceeds to another block, such as block 460.

At block 450, the process 400 involves withholding, by the event restraint-delivery computing system, the at least one subset of event data objects from one or more recipient computing systems associated with the at least one subset of event data objects, such as withholding the first subset of event data objects from the first recipient computing system. In addition, the event restraint-delivery computing system withholds the at least one subset of event data objects during evaluation of the restraint status data corresponding to the at least one subset of event data objects, such as withholding the first subset of event data objects during evaluation of the first set of criteria. For example, the event restraint-delivery computing system 220 withholds the EDO subset 212 from the recipient computing system 292 and withholds the EDO subset 214 from the recipient computing system 294.

In some cases, one or more operations related to block 450 are implemented prior to or concurrently with one or more operations related to blocks 440 or 455. For example, during evaluation of respective restraint status data corresponding to the at least one subset of event data objects, the event restraint-delivery computing system withholds the at least one subset of event data objects from one or more recipient computing systems. In addition, during determination of whether the at least one subset of event data objects fulfills one or more associated trigger criteria, the event restraint-delivery computing system withholds (or continues to withhold) the at least one subset of event data objects from the one or more recipient computing systems. For example, the event restraint-delivery computing system 220 withholds the EDO subset 212 from the recipient computing system 292 during one or more of evaluating the restraint status data 242 or determining whether the EDO subset 212 fulfills the at least one trigger criterion associated with the restraint status data 242. In addition, the event restraint-delivery computing system 220 withholds the EDO subset 214 from the recipient computing system 294 during one or more of evaluating the restraint status data 244 or determining whether the EDO subset 214 fulfills the at least one trigger criterion associated with the restraint status data 244.

In some embodiments, operations related to one or more of blocks 440, 450, or 455 are repeated for multiple evaluations of restraint status data for a particular EDO subset. In some cases, the event restraint-delivery computing system withholds the at least one subset of event data objects from the one or more recipient computing systems during multiple evaluations of the corresponding restraint status data. For example, the event restraint-delivery computing system

220 withholds the EDO subset 212 from the recipient computing system 292 during multiple evaluations of the restraint status data 242 at the timestep 301, the timestep 302, and the timestep 303, e.g., withholding the EDO subsets 212' and 212'' responsive to determining that the trigger criterion associated with the restraint status data 242 is not fulfilled.

At block 460, the process 400 involves providing, by the event restraint-delivery computing system, the at least one subset of event data objects to the one or more associated recipient computing systems, such as providing the first subset of event data objects to the first recipient computing system. In some cases, the one or more associated recipient computing systems is configured to perform one or more computing functions based on the provided subset of event data objects. For example, responsive to determining the a respective trigger criterion for the EDO subset 212 or the EDO subset 214 is fulfilled, the event restraint-delivery computing system 220 provides one or more of the EDO subsets 212 or 214 to, respectively, the recipient computing system 292 and the recipient computing system 294. Based on the EDO subset 212, the recipient computing system 292 or the recipient application 293 is configured to perform one or more computing functions. In addition, based on the EDO subset 214, the recipient computing system 294 or the recipient application 295 is configured to perform one or more computing functions. Examples of computing functions can include data verification functions, database access functions, risk evaluation functions (e.g., fraud probability evaluation, malicious code identification), or other types of computer-implemented functions that are based on one or more event data objects.

In some implementations, the event restraint-delivery computing system determines that the at least one subset of event data objects fulfills one or more error criteria, such as an error criterion related to an incomplete status or other types of errors for a particular EDO subset. Examples of error criteria for an EDO subset could include completing a threshold period of time without meeting a trigger criterion, identification of an event data object that cannot be analyzed (e.g., corrupted data, encrypted with an unrecognized encryption key), or other types of errors that could occur in an EDO subset. In some cases, the event restraint-delivery computing system redirects the particular EDO subset which fulfills the error criterion away from the recipient computing system associated with the particular event data object, e.g., to another computing system. As an example, the event restraint-delivery computing system could redirect the particular EDO subset to a computing system that maintains an error queue. As another example, the event restraint-delivery computing system could reassign some or all event data objects included in the particular EDO subset, such as identifying an additional EDO subset in which to include a reassigned event data object. As a further example, the event restraint-delivery computing system could delete the particular EDO subset, such as deleting some or all of the included event data objects without delivery.

Figure 5:
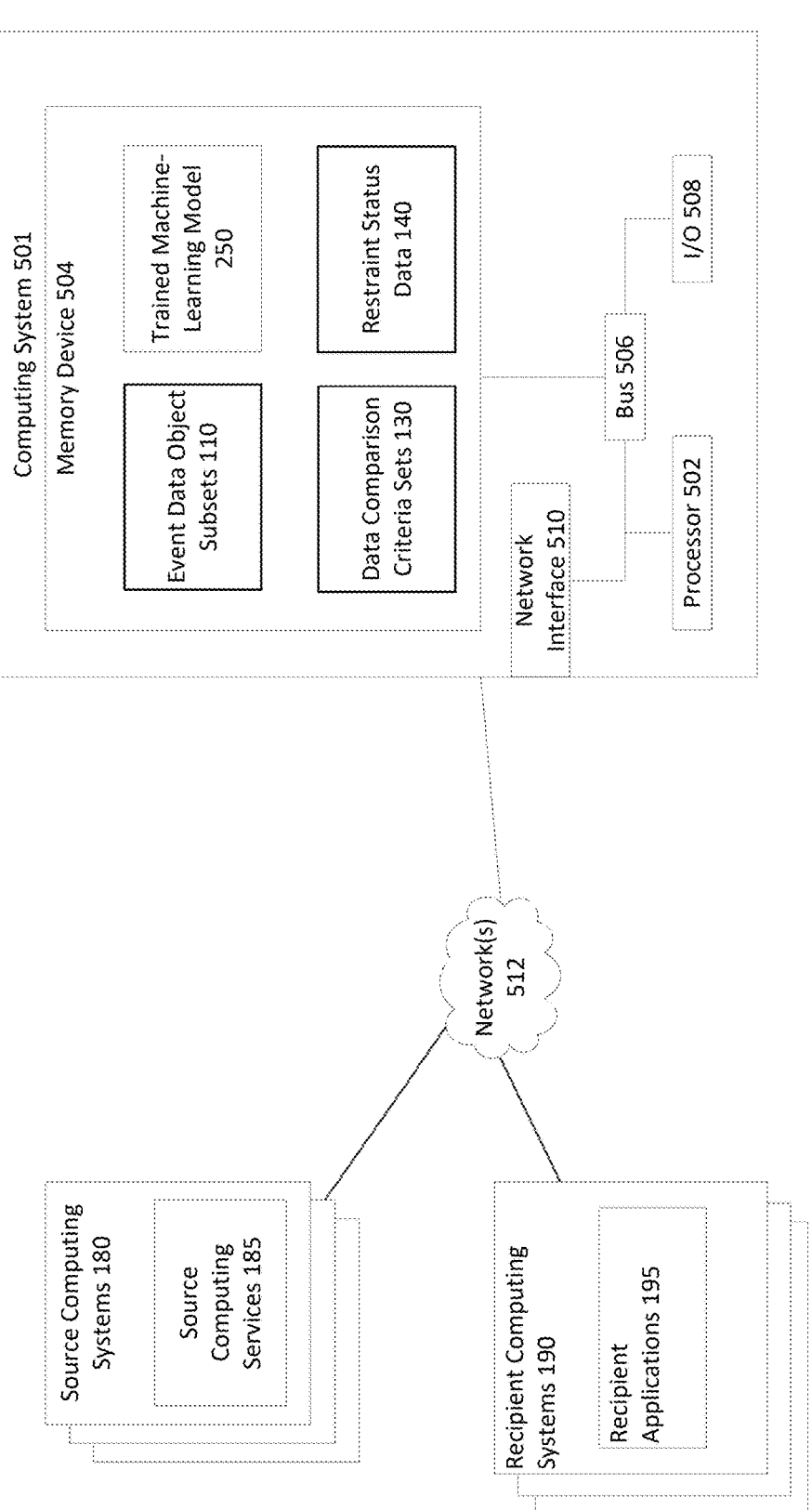
FIG. 5 is a block diagram depicting an example of a computing system for implementing an event restraint-delivery computing system, according to certain embodiments.

Any suitable computing system or group of computing systems can be used for performing the operations described herein. For example, FIG. 5 is a block diagram depicting an example of a computing system configured for implementing an event restraint-delivery computing system, according to certain embodiments.

The depicted example of a computing system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one. In some cases, the computing system 501 includes (or is otherwise capable of accessing) specialized computing resources (e.g., high-speed processing devices) capable of performing comparisons of each event data object included in a continuous high-volume event data stream with the multiple criteria multiple data comparison criteria sets, such as performing comparisons of multiple criteria with hundreds or thousands of event data objects added or removed multiple times per second.

The memory device 504 includes any suitable non-transitory computer-readable medium for storing the EDO subsets 110, the data comparison criteria sets 130, the restraint status data 140, the trained machine-learning model 250, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 501 may also include a number of external or internal devices such as input or output devices. For example, the computing system 501 is shown with an input/output ("I/O") interface 508 that can receive input from input devices or provide output to output devices. A bus 506 can also be included in the computing system 501. The bus 506 can communicatively couple one or more components of the computing system 501.

The computing system 501 executes program code that configures the processor 502 to perform one or more of the operations described above with respect to FIGS. 1-4. The program code includes operations related to, for example, one or more of the EDO subsets 110, the data comparison criteria sets 130, the restraint status data 140, the trained machine-learning model 250, or other suitable applications or memory structures that perform one or more operations described herein. The program code may be resident in the memory device 504 or any suitable computer-readable medium and may be executed by the processor 502 or any other suitable processor. In some embodiments, the program code described above, the EDO subsets 110, the data comparison criteria sets 130, the restraint status data 140, and the trained machine-learning model 250 are stored in the memory device 504, as depicted in FIG. 5. In additional or alternative embodiments, one or more of the EDO subsets 110, the data comparison criteria sets 130, the restraint status data 140, the trained machine-learning model 250, and the program code described above are stored in one or more memory devices accessible via a data network, such as a memory device accessible via a cloud service.

The computing system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. One or more computing systems of the source computing systems 180 or the recipient computing systems 190 are connected to the computing system 501 via the data networks 512. The computing system 501 is able to communicate with one or more of the computing systems of the source computing systems 180 or the recipient computing systems 190 using the network interface 510.

Although FIG. 5 depicts the source computing systems 180 and the recipient computing systems 190 as connected to the computing system 501 via the data networks 512, other embodiments are possible, including one or more of the recipient computing systems 190 being connected to the computing system 501 via one or more additional data networks, such as a virtual private network ("VPN") or local area network ("LAN") that includes the computing system 501 and one or more of the recipient computing systems 190.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of coordinating high-volume streams of event data, the method including operations executed by at least one processor, the operations comprising:

monitoring a high-volume event data stream that includes multiple event data objects generated via multiple source computing systems, wherein each monitored event data object in the monitored high-volume event data stream is compared to multiple sets of criteria, wherein each particular set of criteria is associated with a respective recipient system in a group of multiple recipient computing systems, wherein each one of the multiple recipient computing systems is excluded from the multiple source computing systems, and wherein the multiple sets of criteria include a) a first set of criteria associated with a first recipient computing system and b) a second set of criteria associated with a second recipient computing system;

identifying, from the monitored high-volume event data stream, an event data object subset ("EDO subset") in which each event data object identified for inclusion in the EDO subset matches the first set of criteria;

during an evaluation of restraint status data of the EDO subset, withholding the EDO subset from the first recipient computing system associated with the first set of criteria, wherein the first recipient computing system is excluded from the multiple source computing systems;

responsive to identifying a change in the restraint status data of the EDO subset, providing the EDO subset to the first recipient computing system, wherein the first recipient computing system is configured to perform one or more computing functions based on the EDO subset; and responsive to determining that each event data object identified for inclusion in the EDO subset fails to match the second set of criteria, withholding the EDO subset from the second recipient computing system.

2. The method of claim 1, further comprising:

performing the evaluation of the restraint status data of the EDO subset, wherein the evaluation includes one or more of:

determining an elapsed time calculated from an identification of a first event data object included in the EDO subset, determining, in the EDO subset, a quantity of event data objects received from a particular group of source computing systems, or identifying from the monitored high-volume event data stream an additional event data object for inclusion in the EDO subset.

3. The method of claim 1, wherein the one or more computing functions that the first recipient computing system is configured to perform include at least one of: fraud detection, identity verification, restricting access to digital data by an additional computing device, or restricting access by the additional computing device to an online service.

4. The method of claim 1, further comprising:

modifying a ledger data repository to include, for each monitored event data object in the monitored high-volume event data stream, an event-specific data record indicating an occurrence of each monitored event data object, wherein modifying the ledger data repository occurs during the monitoring of the high-volume event data stream.

5. The method of claim 1, further comprising:

determining a first transformation technique associated with the first recipient computing system; and modifying the EDO subset based on the first transformation technique, wherein providing the EDO subset to the first recipient computing system includes providing the modified EDO subset to the first recipient computing system.

6. The method of claim 5, wherein the first transformation technique includes one or more of: an encryption technique, a communication channel selection technique, or a data value normalization technique.

7. The method of claim 1, further comprising:

applying, to each monitored event data object in the monitored high-volume event data stream, a trained machine-learning model that is configured to:

a) determine one or more characteristics of each monitored event data object, and b) based on the one or more characteristics, determine classification output data of each monitored event data object, wherein the first set of criteria includes at least one criterion indicating a particular classification outcome determined for each event data object identified for inclusion in the EDO subset.

8. An event restraint-delivery computing system comprising:

a processing device; and a memory device in which instructions executable by the processing device are stored for causing the processing device to perform operations comprising:

monitoring a high-volume event data stream that includes multiple event data objects generated via multiple source computing systems, wherein each monitored event data object in the monitored high-volume event data stream is compared to multiple sets of criteria, wherein each particular set of criteria is associated with a respective recipient system in a group of multiple recipient computing systems, wherein each one of the multiple recipient computing systems is excluded from the multiple source computing systems, and wherein the multiple sets of criteria include a) a first set of criteria associated with a first recipient computing system and b) a second set of criteria associated with a second recipient computing system, identifying, from the monitored high-volume event data stream, an event data object subset ("EDO subset") in which each event data object identified for inclusion in the EDO subset matches the first set of criteria;

during an evaluation of restraint status data of the EDO subset, withholding the EDO subset from the first recipient computing system associated with the first set of criteria;

responsive to identifying a change in the restraint status data of the EDO subset, providing the EDO subset to the first recipient computing system, wherein the first recipient computing system is configured to perform one or more computing functions based on the EDO subset; and responsive to determining that each event data object identified for inclusion in the EDO subset fails to match the second set of criteria, withholding the EDO subset from the second recipient computing system.

9. The event restraint-delivery computing system of claim 8, the operations further comprising:

performing the evaluation of the restraint status data of the EDO subset, wherein the evaluation includes one or more of:

determining an elapsed time calculated from an identification of a first event data object included in the EDO subset, determining, in the EDO subset, a quantity of event data objects received from a particular group of the multiple source computing systems, or identifying from the monitored high-volume event data stream an additional event data object for inclusion in the EDO subset.

10. The event restraint-delivery computing system of claim 8, the operations further comprising:

modifying a ledger data repository to include, for each monitored event data object in the monitored high-volume event data stream, an event-specific data record indicating an occurrence of each monitored event data object, wherein modifying the ledger data repository occurs during the monitoring of the high-volume event data stream.

11. The event restraint-delivery computing system of claim 8, the operations further comprising:

determining a first transformation technique associated with the first recipient computing system; and modifying the EDO subset based on the first transformation technique, wherein providing the EDO subset to the first recipient computing system includes providing the modified EDO subset to the first recipient computing system.

12. The event restraint-delivery computing system of claim 8, the operations further comprising:

applying, to each monitored event data object in the monitored high-volume event data stream, a trained machine-learning model that is configured to:

a) determine one or more characteristics of each monitored event data object, and b) based on the one or more characteristics, determine classification output data of each monitored event data object, wherein the first set of criteria includes at least one criterion indicating a particular classification outcome determined for each event data object identified for inclusion in the EDO subset.

13. A non-transitory computer-readable storage medium having program code that is executable by a processor device to cause a computing device to perform operations, the operations comprising:

monitoring a high-volume event data stream that includes multiple event data objects generated via multiple source computing systems, wherein each monitored event data object in the monitored high-volume event data stream is compared to multiple sets of criteria, wherein each particular set of criteria is associated with a respective recipient system in a group of multiple recipient computing systems, wherein each one of the multiple recipient computing systems is excluded from the multiple source computing systems, and wherein the multiple sets of criteria include a) a first set of criteria associated with a first recipient computing system and b) a second set of criteria associated with a second recipient computing system;

identifying, from the monitored high-volume event data stream, an event data object subset ("EDO subset") in which each event data object identified for inclusion in the EDO subset matches the first set of criteria;

during an evaluation of restraint status data of the EDO subset, withholding the EDO subset from the first recipient computing system associated with the first set of criteria, wherein the first recipient computing system is excluded from the multiple source computing systems;

responsive to identifying a change in the restraint status data of the EDO subset, providing the EDO subset to the first recipient computing system, wherein the first recipient computing system is configured to perform one or more computing functions based on the EDO subset; and responsive to determining that each event data object identified for inclusion in the EDO subset fails to match the second set of criteria, withholding the EDO subset from the second recipient computing system.

14. The non-transitory computer-readable storage medium of claim 13, the operations further comprising:

performing the evaluation of the restraint status data of the EDO subset, wherein the evaluation includes one or more of:

determining an elapsed time calculated from an identification of a first event data object included in the EDO subset, determining, in the EDO subset, a quantity of event data objects received from a particular group of the multiple source computing systems, or identifying from the monitored high-volume event data stream an additional event data object for inclusion in the EDO subset.

15. The non-transitory computer-readable storage medium of claim 13, the operations further comprising:

modifying a ledger data repository to include, for each monitored event data object in the monitored high-volume event data stream, an event-specific data record indicating an occurrence of each monitored event data object, wherein modifying the ledger data repository occurs during the monitoring of the high-volume event data stream.

16. The non-transitory computer-readable storage medium of claim 13, the operations further comprising:

determining a first transformation technique associated with the first recipient computing system; and modifying the EDO subset based on the first transformation technique, wherein the providing the EDO subset to the first recipient computing system includes providing the modified EDO subset to the first recipient computing system.

17. The non-transitory computer-readable storage medium of claim 13, the operations further comprising:

applying, to each monitored event data object in the monitored high-volume event data stream, a trained machine-learning model that is configured to:

a) determine one or more characteristics of each monitored event data object, and b) based on the one or more characteristics, determine classification output data of each monitored event data object, wherein the first set of criteria includes at least one criterion indicating a particular classification outcome determined for each event data object identified for inclusion in the EDO subset.

\* \* \* \* \*